United States Patent
Saleh et al.

(10) Patent No.: US 9,913,242 B1
(45) Date of Patent: Mar. 6, 2018

(54) LONG TERM EVOLUTION (LTE) NETWORK SELECTION OF A SERVING GATEWAY (S-GW)

(71) Applicant: Sprint Communications Company L.P., Overland Park, KS (US)

(72) Inventors: Ahmad N. Saleh, Overland Park, KS (US); Rajil Malhotra, Olathe, KS (US); Deveshkumar Narendrapratap Rai, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 132 days.

(21) Appl. No.: 14/974,084

(22) Filed: Dec. 18, 2015

(51) Int. Cl.
| | | |
|---|---|---|
| H04W 64/00 | (2009.01) | |
| H04W 88/16 | (2009.01) | |
| H04B 7/14 | (2006.01) | |
| H04W 84/04 | (2009.01) | |

(52) U.S. Cl.
CPC .......... H04W 64/003 (2013.01); H04B 7/14 (2013.01); *H04W 84/045* (2013.01); *H04W 88/16* (2013.01)

(58) Field of Classification Search
CPC .................................................. H04W 64/003
See application file for complete search history.

(56) References Cited

U.S. PATENT DOCUMENTS

| | | | |
|---|---|---|---|
| 2011/0098050 A1 | 4/2011 | Eipe et al. | |
| 2011/0098051 A1 | 4/2011 | Kamalaraj et al. | |
| 2012/0320817 A1 | 12/2012 | Xu et al. | |
| 2013/0183971 A1 | 7/2013 | Tamaki et al. | |
| 2013/0208649 A1 | 8/2013 | Waldhauser et al. | |
| 2014/0185585 A1* | 7/2014 | Zhang | H04W 36/0033 370/331 |
| 2015/0148062 A1* | 5/2015 | Chen | H04W 60/00 455/456.1 |
| 2015/0156660 A1* | 6/2015 | Luo | H04W 8/02 370/230 |

* cited by examiner

*Primary Examiner* — Saba Tsegaye

(57) ABSTRACT

A first Mobility Management Entity (MME) receives a tracking area update from the User Equipment (UE) indicating a first tracking area for the wireless relay that serves the UE and indicating a second tracking area for the evolved NodeB (eNodeB) that serves the wireless relay. The first MME determines if the first tracking area and the second tracking area are different responsive to the tracking area update, and if the first tracking area and the second tracking area are different, then determines if the wireless relay is controlled by a second MME that also controls the eNodeB. If the wireless relay is not controlled by the second MME that also controls the eNodeB, then the first MME transfers UE context data to the second MME that serves the eNodeB. The second MME selects the Serving Gateway (S-GW) for the UE based on the second tracking area for the eNodeB.

20 Claims, 8 Drawing Sheets

Content skipped for brevity

LONG TERM EVOLUTION (LTE) NETWORK SELECTION OF A SERVING GATEWAY (S-GW)

TECHNICAL BACKGROUND

Wireless communication systems transfer data packets between User Equipment (UE) to provide data communication services, like internet access, media streaming, and user messaging. Wireless communication systems allow users to move about and communicate over the air with access communication. Communication services include voice calls, data exchange, web pages, streaming media, or text messages, among other communication services.

Long Term Evolution (LTE) is a popular wireless technology. Using LTE, a UE detects an evolved NodeB (eNodeB) base station and responsively exchanges Radio Resource Control (RRC) signaling with the eNodeB. The eNodeB then transfers an S1-Application Protocol (S1-AP) message to a Mobility Management Entity (MME), and the MME responsively transfers a Diameter request message to a Home Subscriber System (HSS) and receives a Diameter response message indicating an Access Point Name (APN). The MME process the Diameter response message to generate and transfer an S11 General Packet Radio Service Transfer Protocol (GTP) message to a Serving Gateway (S-GW). The S-GW then generates an S5 GTP message and transfers the message to a Packet Data Network Gateway (P-GW) based on the APN to create a session for the UE. The UE, eNodeB, MME, S-GW, P-GW, and other network elements then exchange additional messaging to set context before the MME transfers S11 modify bearer signaling the S-GW, and the S-GW transfers S5 modify bearer signaling to the P-GW. The UE may then exchange user data over the LTE network.

Wireless networks determine the location of a UE within the network by receiving tracking area updates from the UE. A tracking area may be made up of cells, eNodeBs, market boundaries, physical location coordinates, or some other area division technique. A tracking area update may be initiated by the UE when the UE detects that it has entered a new tracking area, when a periodic tracking area update timer has expired, when a change in the core network capability occurs, or when some other event triggers the UE to request a tracking area update with the network.

The tracking area update is sent to the serving eNodeB over RRC signaling and indicates data associated with the UE, such as an electronic serial number (ESN), mobile station identifier (MSID), a network access identifier (NIA), or some other UE identifiers. The tracking area update also typically includes a current tracking area ID used to identify a tracking area, such as a mobile country code (MCC), a mobile network code (MNC), a tracking area code (TAC), or some other tracking area identifier. The tracking area identifier may be broadcasted to the UE over a Service Information Block (SIB) message. The eNodeB then determines the serving MME and forwards the tracking area update information to the serving MME in a Non-Access Stratum (NAS) file. The MME then determines the S-GW and P-GW to serve the UE.

To expand or enhance the wireless signal coverage of a wireless communication network, wireless communication relays may be added to locations not adequately covered by current network infrastructure. A relay repeats wireless signals exchanged between wireless devices and a wireless network access point. Without the signal repetition provided by the wireless relay, the coverage area of the wireless network access point may otherwise have not extended far enough to serve the wireless devices using the relay. Thus, a wireless relay provides a less resource intensive means for increasing wireless network coverage.

A wireless relay exchanging wireless communications between a UE and a serving eNodeB may be located in a tracking area that is different from the UE, the eNodeB, or both. If the tracking area for the wireless relay is different from the tracking areas of the eNodeB, it may be served by different LTE network control system elements or a different wireless data center. Unfortunately, wireless communications being routed between additional LTE network control system elements and throughout multiple wireless data centers may cause delayed routing or connection failures. Unfortunately, integrating tracking area updates for UEs exchanging wireless communications over a wireless relay located in a different tracking area than its serving eNodeB is neither effective nor efficient.

TECHNICAL OVERVIEW

A first Mobility Management Entity (MME) receives a tracking area update from the User Equipment (UE) indicating a first tracking area for the wireless relay that serves the UE and indicating a second tracking area for the evolved NodeB (eNodeB) that serves the wireless relay. The first MME determines if the first tracking area and the second tracking area are different responsive to the tracking area update, and if the first tracking area and the second tracking area are different, then determines if the wireless relay is controlled by a second MME that also controls the eNodeB. If the wireless relay is not controlled by the second MME that also controls the eNodeB, then the first MME transfers UE context data to the second MME that serves the eNodeB. The second MME selects the Serving Gateway (S-GW) for the UE based on the second tracking area for the eNodeB.

DETAILED DESCRIPTION

Figure 1:
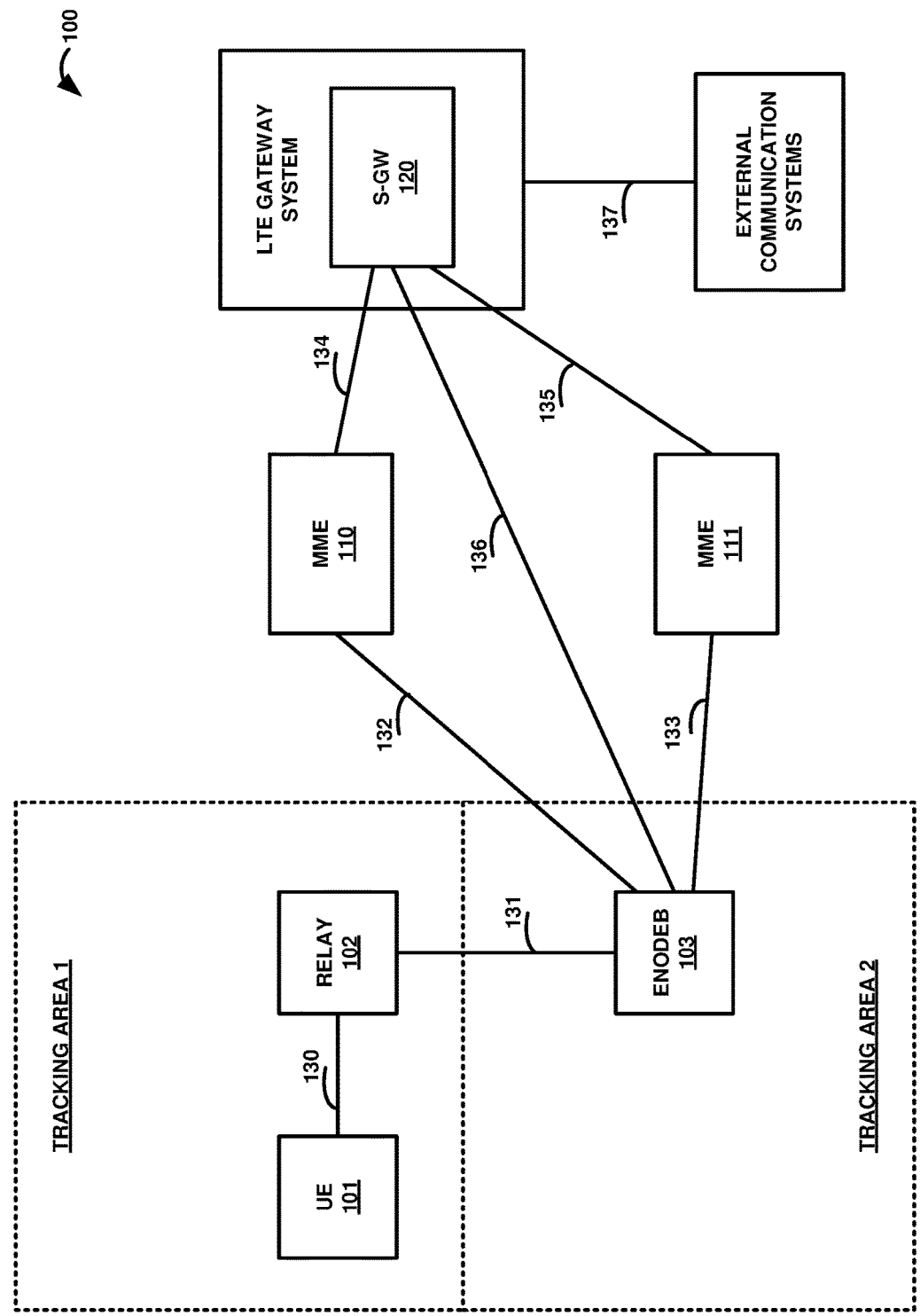
FIGS. 1-3 illustrate a Long Term Evolution (LTE) communication system to select a Serving Gateway (S-GW) for User Equipment (UE).
Figure 2:
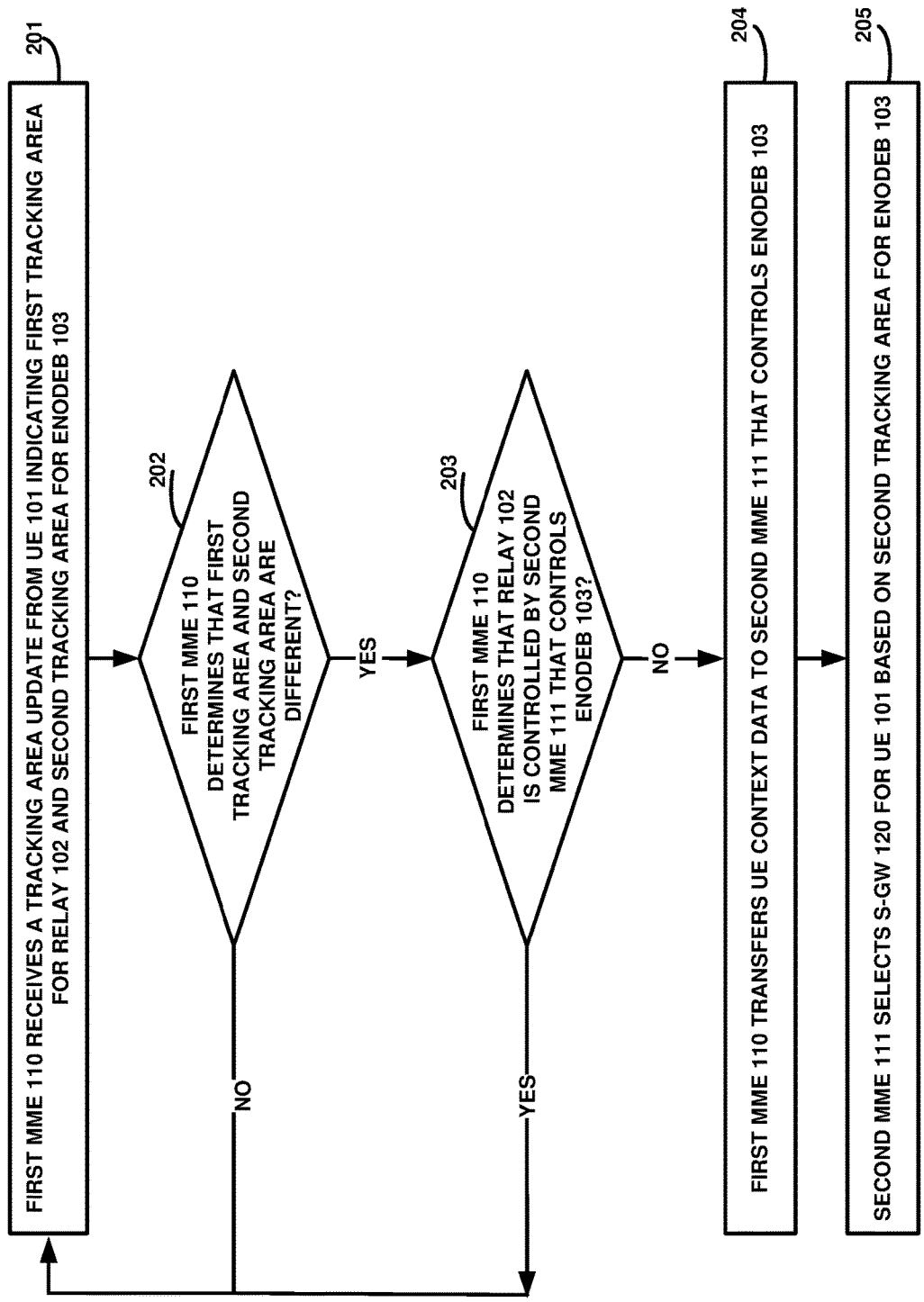
Figure 3:
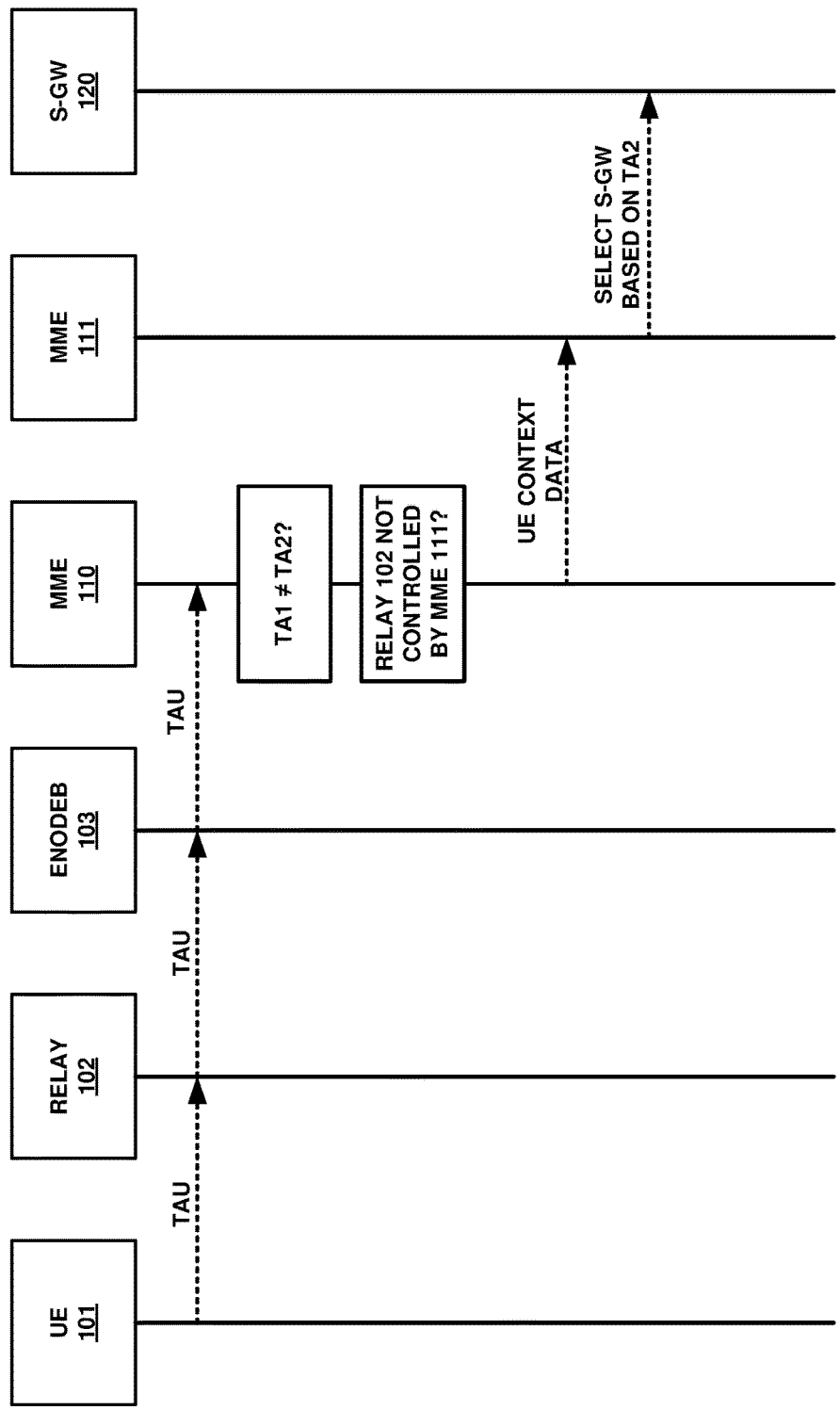

FIGS. 1-3 illustrate Long Term Evolution (LTE) communication system 100 to select a Serving Gateway (S-GW) for User Equipment (UE). Referring to FIG. 1, LTE communication system 100 comprises UE 101, wireless relay 102, evolved NodeB (eNodeB) 103, Mobility Management Entities (MMEs) 110-111, LTE gateway system, and external communication systems. LTE gateway system comprises Serving Gateway (S-GW) 120. UE 101 and wireless relay 102 are located in the first tracking area. eNodeB 103 is located in the second tracking area.

UE 101 and wireless relay 102 communicate over Radio Resource Control (RRC) signaling link 130. Wireless relay 102 and eNodeB 103 communicate over RRC signaling link 131. eNodeB 103 communicates with MMEs 110-111 over S1-MME interface links 132-133. MMEs 110-111 communicate with S-GW 120 over S11 General Packet Radio Service Transfer Protocol (GTP) interface links 134-135. eNodeB 103 and S-GW 120 communicate over S1-U interface link 136. LTE gateway system communicates with external communication system over communication link 137.

In operation, first MME 110 receives a tracking area update from UE 101 indicating a first tracking area for wireless relay 102 that serves UE 101 and indicating a second tracking area for eNodeB 103 that serves wireless relay 102. A tracking area may be made up of cells, eNodeBs, market boundaries, physical location coordinates, or some other area division technique. UE 101 may send a tracking area update when UE 101 detects that it has entered a new tracking area, when a periodic tracking area update timer has expired, when a change in the LTE network capability occurs, or after some other event that triggers UE 101 to request a tracking area update. For example, UE 101 may have been triggered to send a tracking area update after moving from tracking area 1 to tracking area 2.

UE 101 may determine the first tracking area for wireless relay 102 from messages broadcasted from wireless relay 102 and determine the second tracking area for eNodeB 103 from messages broadcasted from eNodeB 103, such as a System Information Block (SIB) Type 1 message. UE 101 may then send both tracking areas in a tracking area update request to eNodeB 103 over RRC signaling, which then forwards the tracking area update information to first MME 110 in a Non-Access Stratum (NAS) file. First MME 110 may be a new MME for UE 101 or an MME which UE 101 had previously been attached to.

The tracking area update may include data associated with UE 101, such as an electronic serial number (ESN), mobile station identifier (MSID), a network access identifier (NIA), or some other UE identifiers. The tracking area update also includes current tracking area identifiers for the first tracking area and the second tracking area, such as mobile country codes (MCCs), mobile network codes (MNCs), tracking area codes (TACs), or other tracking area identifiers.

UE 101 and eNodeB 103 exchange communications over wireless relay 102. eNodeB 103 exchanges communications with LTE network elements over backhaul links. Consequently, adding additional eNodeBs or relocating existing eNodeBs to expand and/or enhance network coverage requires adding additional backhaul links. Therefore, wireless relays/repeaters can be used to extend the wireless coverage of an eNodeB since wireless relays/repeaters do not require a backhaul link to the LTE network and are therefore typically less expensive and less complex systems to deploy than additional eNodeBs. As illustrated in FIG. 1, wireless relay 102 serves to repeat the wireless signals to and from eNodeB 103. Although not shown, other additional access nodes may be used to extend wireless coverage of an eNodeB, such as microcells, picocells, femtocells, mini-macro cells, or some other small cell access node.

Responsive to receiving the tracking area update, first MME 110 determines if the first tracking area and the second tracking area are different. The first tracking area and the second tracking area may be different due to wireless relay 102 being located in the first tracking area while being served by eNodeB 103, which is located in the second tracking area. Wireless relay 102 may determine to exchange signaling and data with an eNodeB in a different tracking area due to loading conditions of the eNodeB in its own tracking area, proximity to the eNodeB in the second tracking area, market association of the wireless relay and the eNodeB, signal strength of the eNodeB in the second tracking area, or for some other reason.

If the first tracking area and the second tracking area are different, then first MME 110 determines if wireless relay 102 is controlled by second MME 111 that also controls eNodeB 103. First MME 110 may be determined to be the controlling MME of wireless relay 102 based on wireless relay 102 initially attaching to first MME 110 and using first MME 110 to exchange communications with other LTE network elements. Second MME 111 may be determined to be the controlling MME of eNodeB 103 based on eNodeB 103 initially attaching to second MME 111 and using second MME 111 to exchange communications with other LTE network elements.

Although wireless relay 102 and eNodeB 103 are located in different tracking areas, they may still be controlled by the same MME. For example, if wireless relay 102 is located in the first tracking area and eNodeB 103 is located in the second tracking area that is neighboring the first tracking area, MME 110 may control both tracking areas. Therefore, wireless communications would not be routed through multiple MMEs.

If wireless relay 102 is not controlled by second MME 111 that also controls eNodeB 103, then first MME 110 transfers UE context data to second MME 111 that controls eNodeB 103. UE context data may comprise a source Internet Protocol (IP) address and port number, and a destination IP address and port number. UE context data may further include the International Mobile Subscriber Identity (IMSI), a current Access Point Name (APN) data, Tunnel Endpoint Identifier (TEID) data, bearer contexts, Quality-of-Service (QoS) parameters, authentication and security functions performed, and any other information first MME 110 may have stored relating to UE 101. UE content data is typically sent from first MME 110 to second MME 111 over an S10 interface link.

For example, in response to determining that wireless relay 102 is in the first tracking area and is not controlled by second MME 111 that controls eNodeB 103, first MME 110 may send a context response message to second MME 111 indicating that UE 101 is associated with a specified IMSI, and an APN data set that identifies an S1 bearer transporting packets between eNodeB 103 and an S-GW and an S5/S8 bearer transporting packet between the S-GW and the P-GW. The context response message in this example may also include the source IP address and port number, the destination IP address and port number, QoS information associated with bearers, such as a QoS Class Identifier (QCI), a Guaranteed Bit Rate (GBR), and an Aggregate Maximum Bit Rate (AMBR).

Still referring to FIG. 1, second MME 111 then selects S-GW 120 for UE 101 based on the second tracking area for eNodeB 103. MME 111 may query a server system, such as a Domain Name Server (DNS), to determine available S-GWs for UE 101. Available S-GWs may be determined based on the location of UE 101, wireless relay 102, or eNodeB 103 using the tracking area update information. For example, S-GW 120 may be the S-GW closest to eNodeB 103 which could minimize the probability that a new S-GW is required as UE 101 moves around and possibly attaches to other small cells.

In some examples, if the first tracking area and the second track area are not different, then first MME 110 selects S-GW 120 for UE 101 based on the first tracking area for wireless relay 102. For example, first MME 110 may select S-GW 120 based on the first tracking area for wireless relay 102 since S-GW 120 is closest to wireless relay 102.

In some examples, if wireless relay 102 is controlled by second MME 111 that also controls eNodeB 103, then second MME 111 selects S-GW 120 for UE 101 based on the second tracking area for eNodeB 103. For example, if wireless relay 102 located in tracking area 1 and eNodeB 103 located in tracking area 2 are both controlled by second MME 111, then second MME 111 may select S-GW 120 based on tracking area 2 so that the data exchanged between the LTE gateway system and eNodeB 103 is routed through the closest S-GW.

In some examples, wireless relay 102 broadcasts a first tracking area code for wireless relay 102 and broadcasts a second tracking area code for eNodeB 103 that serves wireless relay 102. In other examples, UE 101 receives a broadcast from wireless relay 102 indicating the first tracking area for wireless relay 102 that serves UE 101, and the second tracking area for eNodeB 103 that serves wireless relay 102. For example, wireless relay 102 may receive the second tracking area code from eNodeB 103. Wireless relay 102 may then broadcast both its own tracking area code and a second tracking area code for eNodeB 103. In this examples, UE 101 would then receive both tracking area codes and responsively transfer the tracking area update containing the first tracking area code for wireless relay 102 and the second tracking area code for eNodeB 103 broadcasted by wireless relay 102 to first MME 110.

In some examples, wireless relay 102 broadcasts a second tracking area code for eNodeB 103 that serves wireless relay 102 in a Service Information Block (SIB) 1. In other examples, UE 101 receives a SIB 1 broadcast from wireless relay 102 indicating the second tracking area for eNodeB 103. Wireless relay 102 may periodically transmit data in overhead messages in the form of SIB Type 1 messages to UE 101, mini-macro cells, and other wireless communication devices.

SIB 1 messages typically include parameters that are needed by UEs to acquire other information from the cell, such as a tracking area identifier, a cell identifier, channel bandwidth, system frame number, physical hybrid automatic repeat request (HARQ) indicator channel (PHICH), and the capabilities of the radio access network and core network. For example, eNodeB 103 may broadcast the second tracking area code to wireless relay 102. Wireless relay 102 may then periodically broadcast a SIB 1 message to UE 101 indicating the second tracking area of eNodeB 103, a cell identifier, and the channel bandwidth.

In some examples, eNodeB 103 broadcasts a first Public Land Mobile Network (PLMN) Identifier (ID) for UE 101 attachment and a second PLMN ID for wireless relay 102 attachment. The PLMN ID is a network that provides land mobile telecommunications to the public and typically includes an MCC and an MNC. For example, eNodeB 103 may broadcast a first PLMN ID for UE 101 attachment that has an MCC of 310 and an MNC of 001. eNodeB 103 may also broadcast a second PLMN ID for wireless relay 102 attachment that also has an MCC of 310, but has an MNC of 002.

In some examples, second MME 111 selects a Packet Data Network Gateway (P-GW) for UE 101 based on an APN for UE 101. In this example, second MME 111 would then select S-GW 120 based on the second tracking area for eNodeB 103 and based on the selected P-GW. For example, second MME 111 may query a DNS to determine an APN data set indicating list of available P-GWs for UE 101 and/or wireless relay 102. Second MME 111 would then select S-GW 120 based on available S-GWs for the second tracking area and that may be paired with the available P-GWs indicated by the APN data set.

In some examples, first MME 110 receives the tracking area update for UE 101 by receiving a Non-Access Stratum (NAS) file from UE 101 indicating a UE identifier, the first tracking area for wireless relay 102 that serves UE 101, and the second tracking area for eNodeB 103 that serves wireless relay 102.

FIG. 2 is a flow diagram illustrating an operation of LTE communication system 100 to select an S-GW for a UE. First MME 110 receives (201) a tracking area update from UE 101 indicating a first tracking area for wireless relay 102 that serves UE 101 and indicating a second tracking area for eNodeB 103 that serves wireless relay 102. First MME 110 determines (202) if the first tracking area and the second tracking area are different responsive to the tracking area update. If the first tracking area and the second tracking area are different, then first MME 110 determines (203) if wireless relay 102 is controlled by second MME 111 that also controls eNodeB 103. If wireless relay 102 is not controlled by second MME 111 that also controls eNodeB 103, then first MME 110 transfers (204) UE context data to second MME 111 that controls eNodeB 103. Second MME 111 then selects (205) S-GW 120 for UE 101 based on the second tracking area for eNodeB 103.

FIG. 3 is a sequence diagram illustrating the operation of LTE communication system 100 to select an S-GW for a UE. UE 101 transfers a tracking area update to eNodeB 103 over wireless relay 102. eNodeB 103 then transfers the tracking area update indicating a first tracking area for wireless relay 102 and a second tracking area for eNodeB 103 to first MME 110. In response to receiving the tracking area update for UE 101, first MME 110 determines if the first tracking area and the second tracking area are different. If the first tracking area and the second tracking area are different, then first MME 110 determines if wireless relay 102 is controlled by second MME 111 that also controls eNodeB 103. If wireless relay 102 is not controlled by second MME 111 that also controls eNodeB 103, then first MME 110 transfers UE context data to second MME 111 that controls eNodeB 103. Second MME 111 then selects S-GW 120 for UE 101 based on the second tracking area for eNodeB 103.

Figure 4:
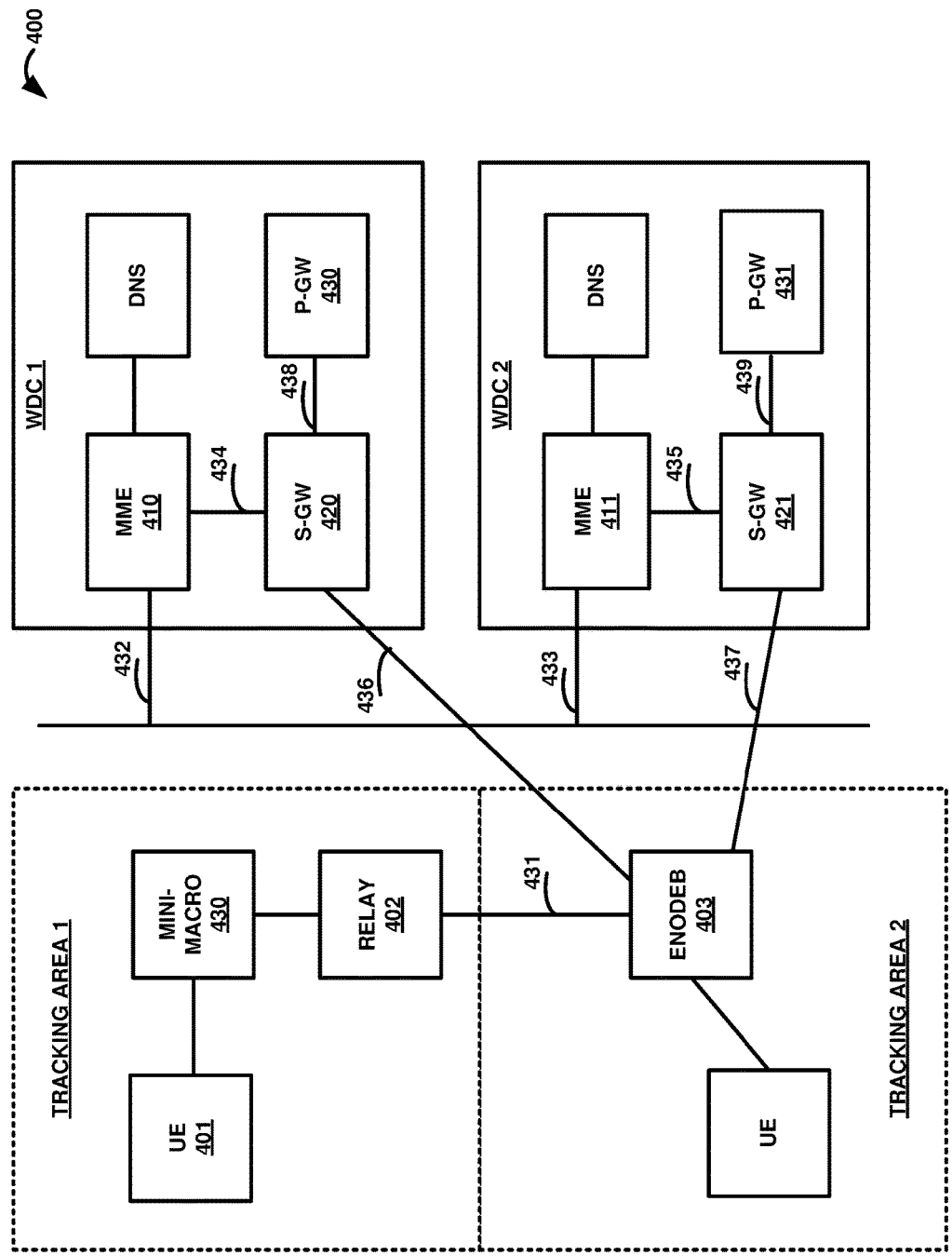
FIGS. 4-7 illustrate an LTE network to select an S-GW for UEs.
Figure 5:
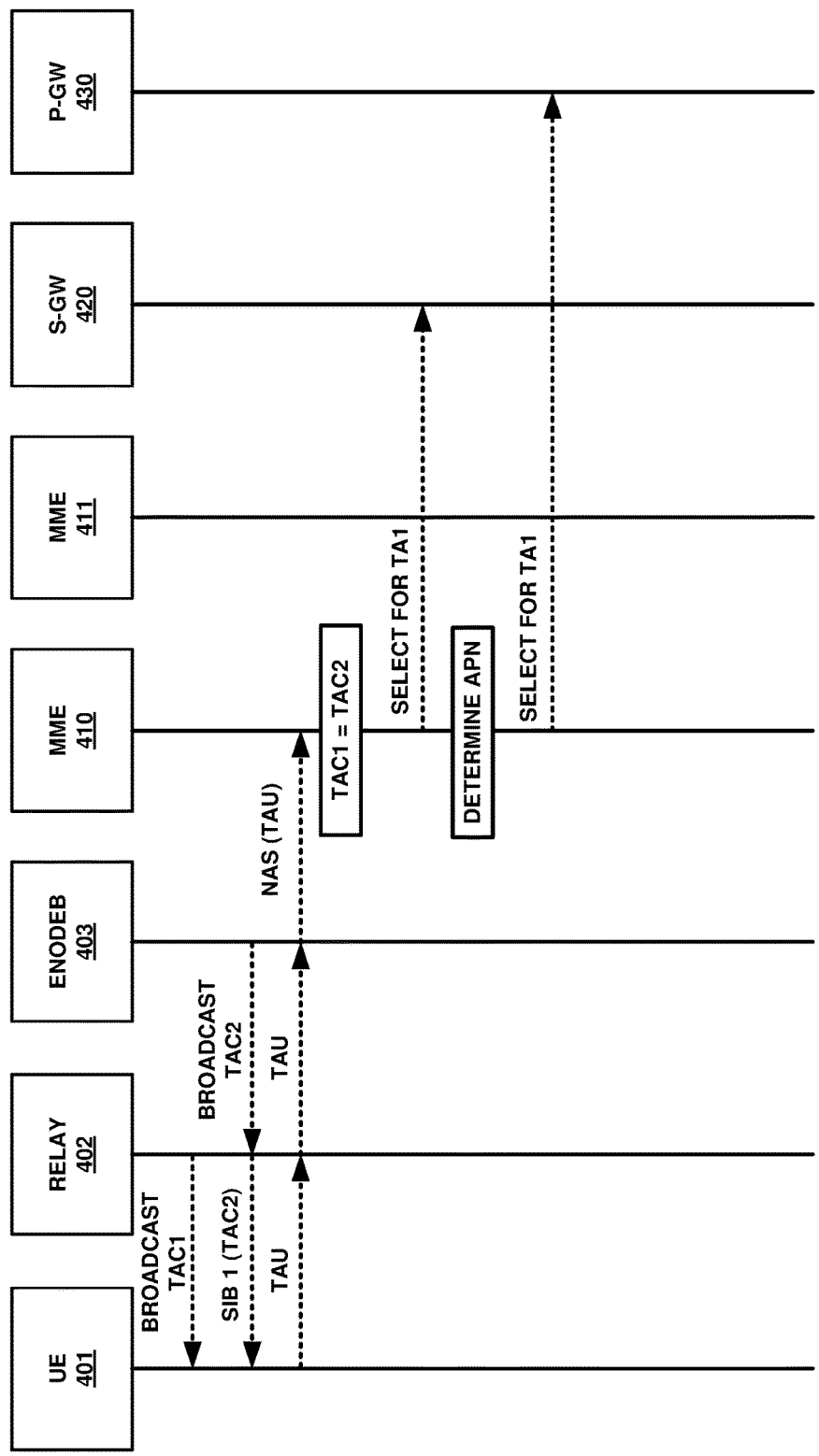

FIGS. 4-5 illustrate Long Term Evolution (LTE) communication system 400 to select an S-GW for a UE. LTE communication system 400 is an example of LTE communication system 100, although communication system 100 may use alternative configurations and operations. Referring to FIG. 4, LTE communication system 400 includes UE 401, mini-macro access node 430, wireless relay 402, eNodeB 403, and wireless data center 1 and wireless data center 2. Wireless data center 1 comprises MME 410, S-GW 420, P-GW 430, and DNS. Wireless data center 2 comprises MME 411, S-GW 421, P-GW 431, and DNS.

UE 401 and wireless relay 402 communicate over the mini-macro access node 430. Wireless relay 402 and eNodeB 403 communicate over RRC signaling link 431. eNodeB 403 communicates with MMEs 410-411 over S1-MME interface links 432-433, respectively. MMEs 410-411 communicate with S-GWs 420-421 over S11 GTP interface links 434-435. eNodeB 403 and S-GWs 420-421 communicate over S1-U interface links 436-437. S-GWs 420-421 communicate with P-GWs 430-431 over S5/S8 interface links 438-439.

FIG. 4 also includes tracking area 1 and tracking area 2, as indicated by the dotted lines. UE 401, mini-macro access node 430, and wireless relay 402 are located in tracking area 1. eNodeB 403 is located in tracking area 2 and communicates with wireless relay 402 across the tracking area boundary. Although not shown in FIG. 4, there may be an additional eNodeB located in tracking area 1. However, in this example, wireless relay 402 is attached to eNodeB 403. This may be due to wireless relay 402 being located near the boundary line of tracking area 1, eNodeB 403 may provide a stronger signal strength to wireless relay 402, eNodeB 403 may be owned by the same mobile carrier as wireless relay 402, or due to some other reason that wireless relay 402 would attach to eNodeB 403 located in tracking area 2 instead of an eNodeB located in tracking area 1.

FIG. 5 illustrates an operation of LTE communication system 400 to select an S-GW for a UE. Wireless relay 402 initially broadcasts a first tracking area code for tracking area 1 that wireless relay 402 is located within to UE 401. eNodeB 403 broadcasts a second tracking area code for tracking area 2 that eNodeB 403 is located within to wireless relay 402. In response to receiving the second tracking area code from eNodeB 403, wireless relay 402 then broadcasts the second tracking area code for eNodeB 403 that serves wireless relay 402 in a SIB 1 message to UE 401.

In response to receiving both the first tracking area code for wireless relay 402 that is serving UE 401 and the SIB 1 broadcast from wireless relay 402 indicating the second tracking area code for eNodeB 403 that serves wireless relay 402, UE 401 transfers a tracking area update to eNodeB 403 over wireless relay 402 and the mini-macro cell (not shown). eNodeB 403 then transfers the tracking area update received from UE 401 to first MME 410 in a NAS file indicating a UE identifier, the first tracking area for wireless relay 402, and the second tracking area for eNodeB 403.

Still referring to FIG. 5, first MME 410 then determines if the first tracking area and the second tracking area are the same by querying the DNS located in wireless data center 1. In this example, the first tracking area and the second tracking area are the same. Therefore, first MME 410 selects S-GW 420 located in wireless data center 1 for UE 401 based on the first tracking area for wireless relay 402. First MME 410 then queries the DNS in wireless data center 1 to determine a list of APNs. Based on the list of APNs, first MME 410 selects P-GW 430 for UE 401.

Figure 6:
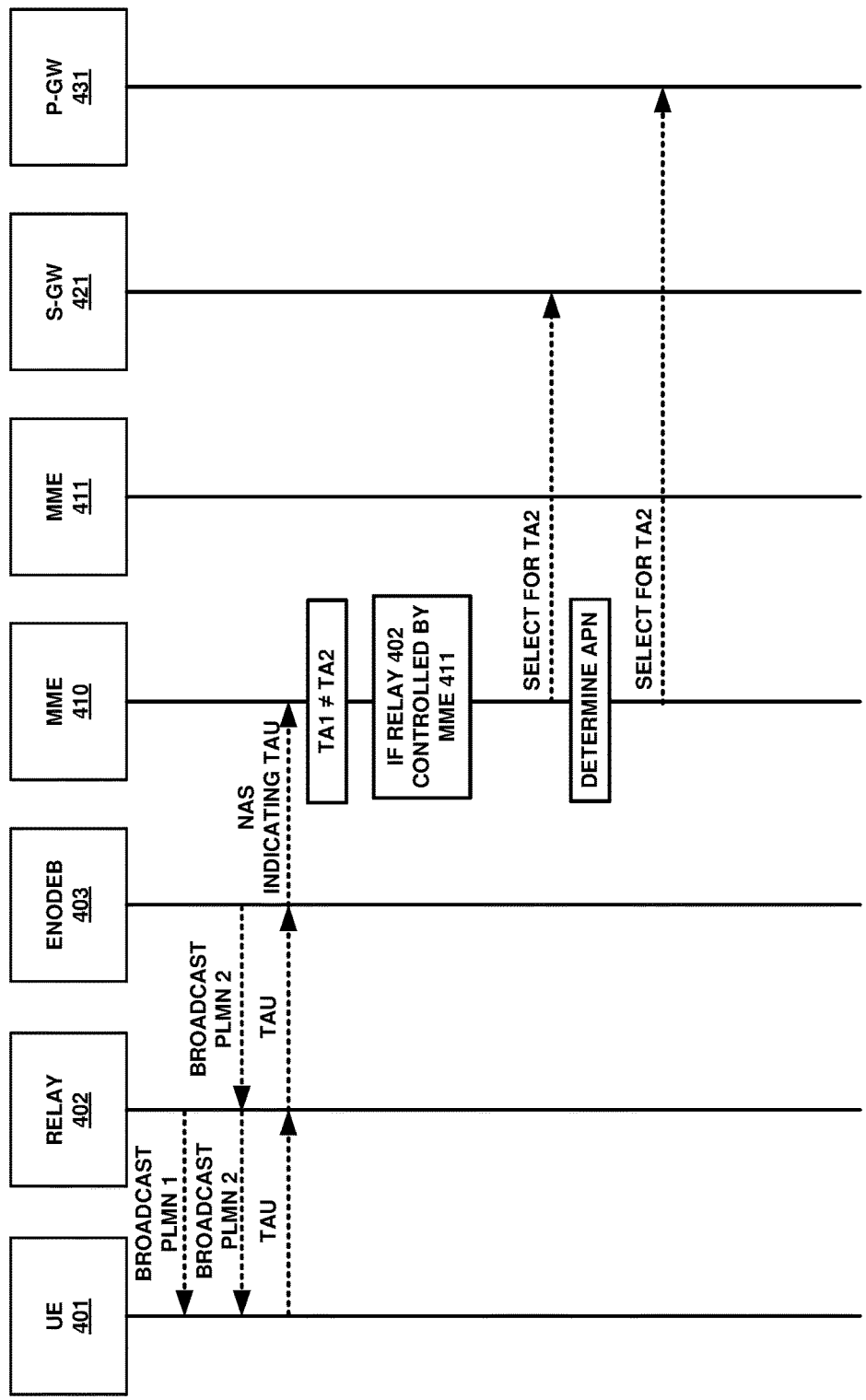

FIG. 6 illustrates an alternative operation of LTE communication system 400 to select an S-GW for a UE. In this example, wireless relay 402 initially broadcasts a first PLMN ID for UE 401 attachment. eNodeB 403 broadcasts a second PLMN ID for wireless relay 402 attachment. In response to receiving the second PLMN ID from eNodeB 403, wireless relay 402 also broadcasts the second PLMN ID to UE 401.

In response to receiving both the first PLMN ID for UE 401 attachment and the second PLMN ID for wireless relay 402 attachment to eNodeB 403, UE 401 transfers a tracking area update to eNodeB 403 over wireless relay 402. eNodeB 403 then transfers the tracking area update received from UE 401 to first MME 410 in a NAS file indicating a UE identifier, a first tracking area for wireless relay 402 based on the first PLMN ID, and a second tracking area for eNodeB 403 based on the second PLMN ID.

Still referring to FIG. 6, first MME 410 then determines if the first tracking area and the second tracking area are the same by querying the DNS located in wireless data center 1. In this example, the first tracking area and the second tracking area are different. In response to determining that the first tracking area and the second tracking area are different, first MME 410 queries the DNS to determine if wireless relay 402 is controlled by second MME 411 located in wireless data center 2 that also controls eNodeB 403. In this example, wireless relay 402 is controlled by second MME 411 located in wireless data center 2 that also controls eNodeB 403. Therefore, first MME 110 selects S-GW 421 located in wireless data center 2 for UE 401 based on the second tracking area for eNodeB 403. First MME 410 then queries the DNS in wireless data center 2 to determine a list of APNs. Based on the list of APNs, first MME 410 selects P-GW 431 for UE 401.

Figure 7:
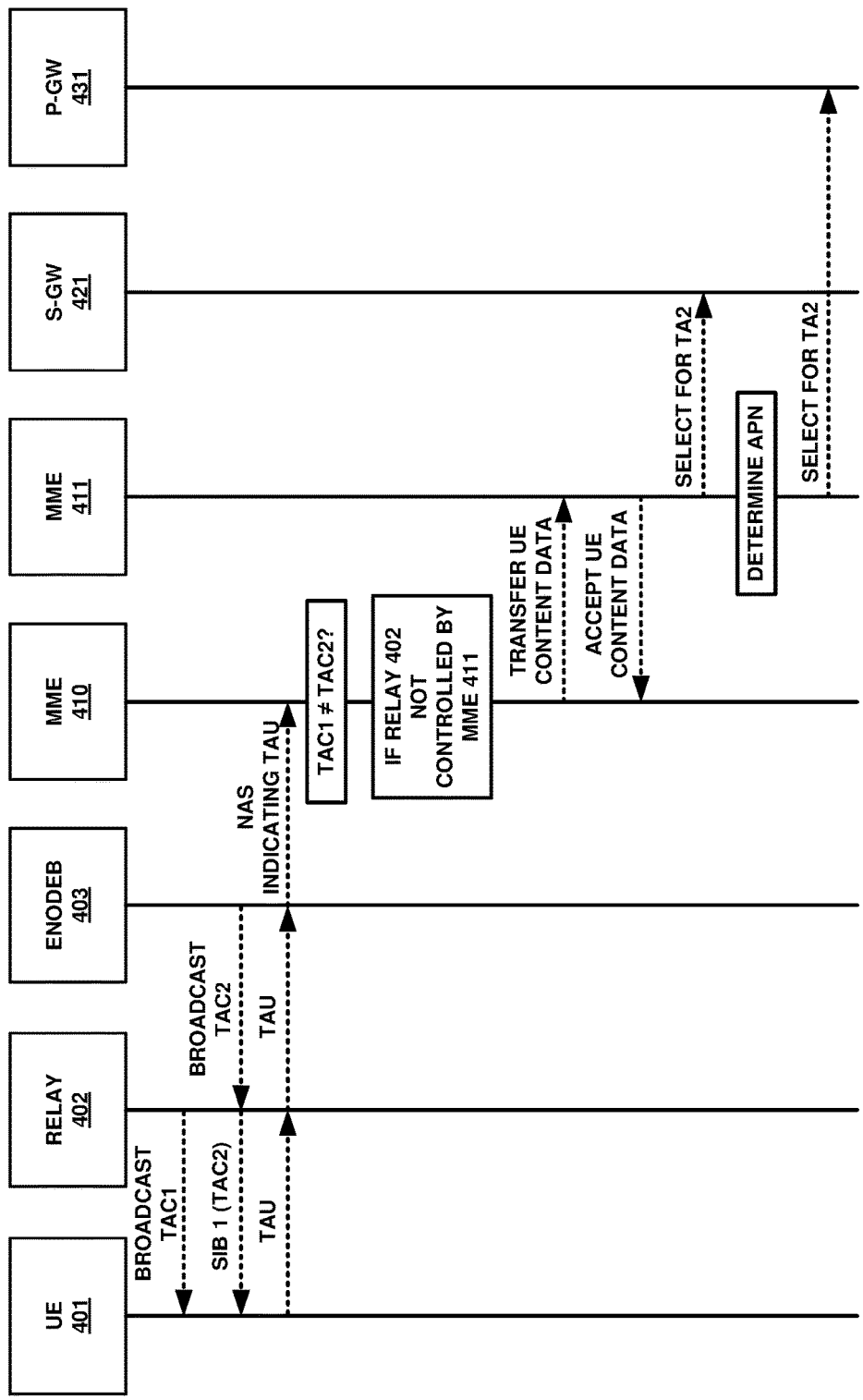

FIG. 7 illustrates an alternative operation of LTE communication system 400 to select an S-GW for a UE. Wireless relay 402 initially broadcasts a first tracking area code for tracking area 1 that wireless relay 402 is located within to UE 401. eNodeB 403 broadcasts a second tracking area code for tracking area 1 that eNodeB 403 is located within the wireless relay 402. In response to receiving the second tracking area code from eNodeB 403, wireless relay 402 then broadcasts the second tracking area code for eNodeB 403 that serves wireless relay 402 in a SIB 1 message.

In response to receiving both the first tracking area code for wireless relay 402 that is serving UE 401 and the SIB 1 broadcast from wireless relay 402 indicating the second tracking area code for eNodeB 403 that serves wireless relay 402, UE 401 transfers a tracking area update to eNodeB 403 over wireless relay 402. eNodeB 403 then transfers the tracking area update received from UE 401 to first MME 410 in a NAS file indicating a UE identifier, the first tracking area for wireless relay 402, and the second tracking area for eNodeB 403.

Still referring to FIG. 7, first MME 410 then determines if the first tracking area and the second tracking area are the same by querying the DNS located in wireless data center 1. In this example, the first tracking area and the second tracking area are different. In response to determining that the first tracking area and the second tracking area are different, first MME 410 queries the DNS to determine if wireless relay 402 is controlled by second MME 411 located in wireless data center 2 that also controls eNodeB 403. In this example, wireless relay 402 is not controlled by second MME 411 located in wireless data center 2 that also controls eNodeB 403. Therefore, first MME 110 transfers UE context data to second MME 411 over an S10 interface link. After receiving the UE context data, second MME 411 selects S-GW 421 located in wireless data center 2 for UE 401 based on the second tracking area for eNodeB 403. Second MME 411 then queries the DNS in wireless data center 2 to determine a list of APNs. Based on the list of APNs, second MME 411 selects P-GW 431 for UE 401.

Figure 8:
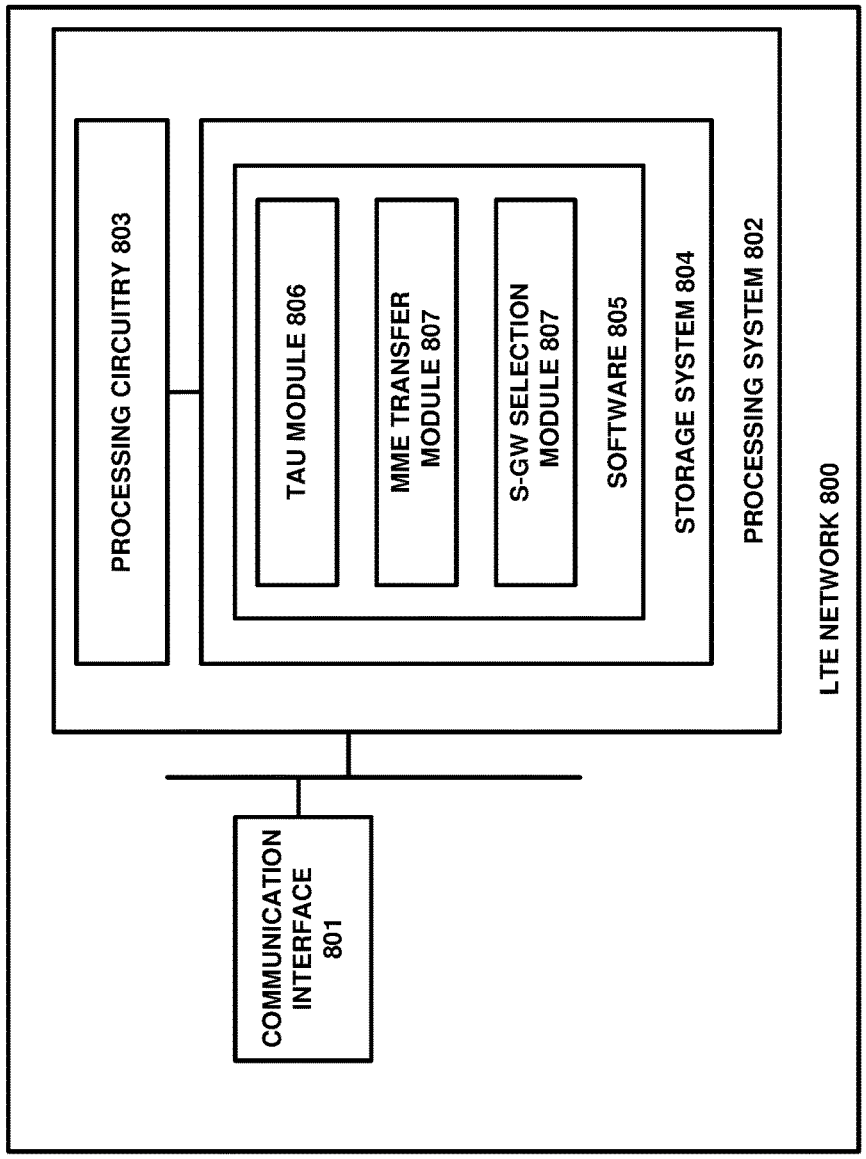
FIG. 8 illustrates an LTE network to select an S-GW for UEs.

FIG. 8 illustrates LTE network 800 to select an S-GW for a UE. LTE network 800 is an example of LTE communication system 100 and LTE communication system 400, although LTE communication system 100 and LTE communication system 400 may use alternative configurations and operations. LTE network 800 includes communication interface 801 and data processing system 802. Data processing system 802 is linked to communication interface 801.

Communication interface 801 comprises communication components, such as antennas, ports, amplifiers, filters, modulators, signal processors, and the like. Communication interface 801 receives a tracking area update from a UE indicating a first tracking area for a wireless relay that serves the UE and a second tracking area for an eNodeB that serves the wireless relay.

Data processing system 802 includes processing circuitry 803 and storage system 804 that stores software 805. Processing circuitry 803 comprises a microprocessor and other circuitry that retrieves and executes software 805 from storage system 804. Storage system 804 comprises a non-transitory storage medium, such as a disk drive, flash drive, data storage circuitry, or some other memory apparatus. Software 805 comprises computer programs, firmware, or some other form of machine-readable processing instructions. Software 805 may further include an operating system, utilities, drivers, network interfaces, applications, or some other type of software. When executed by processing circuitry 803, software 805 directs processing system 802 to operate LTE network 800 as described herein.

In particular, when executed by processing circuitry 803, tracking area update module 806 directs processing circuitry 804 to receive and process tracking area updates from UEs indicating a first tracking area for a wireless relay that serves a UE and indicating a second tracking area for an eNodeB that serves the wireless relay. When executed by processing circuitry 803, tracking area update module 806 also directs processing circuitry 804 to determine if the first tracking area and the second tracking area are different responsive to the tracking area update.

When executed by processing circuitry 803, MME transfer module 807 directs processing circuitry 803 to determine if the wireless relay is controlled by a second MME that also controls the eNodeB if the first tracking area and the second tracking area are different. When executed by processing circuitry 803, MME transfer module 807 also directs processing circuitry 803 to transfer UE context data from a first MME to a second MME if the wireless relay is controlled by the second MME that also controls the eNodeB. When executed by processing circuitry 803, S-GW selection module 808 directs processing circuitry 803 to select the S-GW for the UE based on the second tracking area for the eNodeB.

Referring back to FIG. 1, UE 101 could be a phone, tablet computer, media device, or some other apparatus having a wireless LTE transceiver. UE 101 includes processing circuitry and memory that store and execute various software modules. UE 101 comprises communication transceivers, such as antennas, ports, bus interfaces, signal processors, memory, and software.

Wireless relay 102, eNodeB 103, MMEs 110-111, S-GW 120, and LTE gateway system each may include communication interfaces, network interfaces, processing systems, computer systems, microprocessors, storage systems, storage media, or some other processing devices or software systems, and may be distributed among multiple devices. In particular, wireless relay 102 and eNodeB 103 may be configured to provide wireless coverage to one or more UEs. MMEs 110-111 are control nodes within the LTE access network and are responsible for determining the proper S-GWs and P-GWs for communication with a UE.

S-GW 120 provides connectivity between MMEs 110-111, UE 101, and the LTE gateway systems. The LTE gateway systems may include P-GWs, High Speed Packet Access Gateway (HSPA-GA), High Rate Packet Data Gateway (HRPD-GW), Evolved Packet Data Gateway (ePDG), Multimedia Broadcast Multicast Service Gateway (M-GW), and/or some other type of data packet interface which provides connectivity between the LTE network and various external communication systems, such as internet or an IP Multimedia Subsystem (IMS).

Wireless links 130-131 may use air, space, or some other wireless material that transports media. Wireless links 130-131 may use protocols, such as LTE, Code Division Multiple Access (CDMA), Evolution Data Only (EVDO), IP, or some other wireless communication formats—including combinations thereof. Communication links 132-137 may use metal, glass, optics, air, space, or some other material as the transport media. Communication links 132-137 may use Time Division Multiplexing (TDM), IP, Ethernet, Synchronous Optical Networking (SONET), communication signaling, wireless communications, or some other communication format—including improvements thereof. Communication links 132-137 may be a direct link, or can include intermediate networks, systems, or devices, and can include a logical network link transported over multiple physical links.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a Long Term Evolution (LTE) network to select a Serving Gateway (S-GW) for User Equipment (UE), wherein the UE is served by a wireless relay, and wherein the wireless relay is served by an eNodeB, the method comprising:
  a first Mobility Management Entity (MME) receiving a tracking area update from the UE indicating a first tracking area for the wireless relay that serves the UE and indicating a second tracking area for the eNodeB that serves the wireless relay;
  the first MME determining if the first tracking area and the second tracking area are different responsive to the tracking area update, and if the first tracking area and the second tracking area are different, then determining if the wireless relay is controlled by a second MME that also controls the eNodeB;
  if the wireless relay is not controlled by the second MME that also controls the eNodeB, then the first MME transferring UE context data to the second MME that controls the eNodeB; and
  the second MME selecting the S-GW for the UE based on the second tracking area for the eNodeB.

2. The method of claim 1 further comprising, if the first tracking area and the second tracking area are not different, then the first MME selecting the S-GW for the UE based on the first tracking area for the wireless relay.

3. The method of claim 1 further comprising, if the wireless relay is controlled by the second MME that also controls the eNodeB, then the first MME selecting the S-GW for the UE based on the second tracking area for the eNodeB.

4. The method of claim 1 further comprising the wireless relay broadcasting the first tracking area for the wireless relay and broadcasting the second tracking area for the eNodeB that serves the wireless relay.

5. The method of claim 1 further comprising the wireless relay broadcasting the second tracking area for the eNodeB that serves the wireless relay in a Service Information Block (SIB) 1.

6. The method of claim 1 further comprising the eNodeB broadcasting a first Public Land Mobile Network (PLMN) identifier (ID) for UE attachment and a second PLMN ID for wireless relay attachment.

7. The method of claim 1 further comprising the second MME selecting a Packet Data Network Gateway (P-GW) for the UE based on an Access Point Name (APN) for the UE and wherein selecting the S-GW comprises selecting the S-GW based on the second tracking area for the eNodeB and based on the selected P-GW.

8. The method of claim 1 wherein the first MME receiving the tracking area update from the UE comprises receiving a Non-Access Stratum (NAS) file from the UE indicating the UE identifier (ID), the first tracking area for the wireless relay that serves the UE, and the second tracking area for the eNodeB that serves the wireless relay.

9. The method of claim 1 further comprising the UE receiving a broadcast from the wireless relay indicating the first tracking area for the wireless relay that serves the UE and the second tracking area for the eNodeB that serves the wireless relay and the UE responsively transferring the tracking area update.

10. The method of claim 1 further comprising the UE receiving a Service Information Block (SIB) 1 broadcast from the wireless relay indicating the second tracking area for the eNodeB that serves the wireless relay and the UE responsively transferring the tracking area update.

11. A Long Term Evolution (LTE) network to select a Serving Gateway (S-GW) for User Equipment (UE), wherein the UE is served by a wireless relay, and wherein the wireless relay is served by an eNodeB, comprising:
a first Mobility Management Entity (MME) configured to receive a tracking area update from the UE indicating a first tracking area for the wireless relay that serves the UE and indicating a second tracking area for the eNodeB that serves the wireless relay;
the first MME configured to determine if the first tracking area and the second tracking area are different responsive to the tracking area update, and if the first tracking area and the second tracking area are different, then to determine if the wireless relay is controlled by a second MME that also controls the eNodeB;
if the wireless relay is not controlled by the second MME that also controls the eNodeB, then the first MME configured to transfer UE context data to the second MME that controls the eNodeB; and
the second MME configured to select the S-GW for the UE based on the second tracking area for the eNodeB.

12. The LTE network of claim 11 further comprising, if the first tracking area and the second tracking area are not different, then the first MME is configured to select the S-GW for the UE based on the first tracking area for the wireless relay.

13. The LTE network of claim 11 further comprising, if the wireless relay is controlled by the second MME that also controls the eNodeB, then the first MME is configured to select the S-GW for the UE based on the second tracking area for the eNodeB.

14. The LTE network of claim 11 further comprising the wireless relay configured to broadcast the first tracking area for the wireless relay and to broadcast the second tracking area for the eNodeB that serves the wireless relay.

15. The LTE network of claim 11 further comprising the wireless relay configured to broadcast the second tracking area for the eNodeB that serves the wireless relay in a Service Information Block (SIB) 1.

16. The LTE network of claim 11 further comprising the eNodeB configured to broadcast a first Public Land Mobile Network (PLMN) identifier (ID) for UE attachment and a second PLMN ID for wireless relay attachment.

17. The LTE network of claim 11 further comprising the second MME configured to select a Packet Data Network Gateway (P-GW) for the UE based on an Access Point Name (APN) for the UE and to select the S-GW based on the second tracking area for the eNodeB and based on the selected P-GW.

18. The LTE network of claim 11 wherein the first MME configured to receive the tracking area update from the UE comprises the first MME configured to receive a Non-Access Stratum (NAS) file from the UE indicating the UE identifier (ID), the first tracking area for the wireless relay that serves the UE, and the second tracking area for the eNodeB that serves the wireless relay.

19. The LTE network of claim 11 further comprising the UE configured to receive a broadcast from the wireless relay indicating the first tracking area for the wireless relay that serves the UE and the second tracking area for the eNodeB that serves the wireless relay and the UE configured to responsively transfer the tracking area update.

20. The LTE network of claim 11 further comprising the UE configured to receive a Service Information Block (SIB) 1 broadcast from the wireless relay indicating the second tracking area for the eNodeB that serves the wireless relay and the UE configured to responsively transfer the tracking area update.

* * * * *